(12) United States Patent
Lin

(10) Patent No.: US 6,834,895 B2
(45) Date of Patent: Dec. 28, 2004

(54) LOCKING MECHANISM

(75) Inventor: Wei-Hsin Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/457,530

(22) Filed: Jun. 10, 2003

(65) Prior Publication Data
US 2004/0195842 A1 Oct. 7, 2004

(51) Int. Cl.[7] .................................................. E05C 7/00
(52) U.S. Cl. ........................................... 292/34; 292/159
(58) Field of Search ............................ 292/34, 37, 159, 292/169, 187, 140

(56) References Cited

U.S. PATENT DOCUMENTS 2,380,708 A * 7/1945 Schlage et al. ............. 292/140
2,757,032 A * 7/1956 Stieglitz ....................... 292/34
4,330,145 A * 5/1982 Bisbing ........................ 292/37
5,149,152 A * 9/1992 Lanius ......................... 292/37
5,711,427 A * 1/1998 Nyseth ....................... 206/710
6,350,418 B1 * 2/2002 Venderpool et al. ........ 422/297

* cited by examiner

Primary Examiner—Gary Estremsky
(74) Attorney, Agent, or Firm—Bacon & Thomas

(57) ABSTRACT

A locking mechanism mounted on a cover to lock the cover onto a frame. In the locking mechanism, when a handle shaft is rotated, a first cam element of a rotating sheet drives a second cam element of a sliding sheet due to rotation. A second horizontal fastening element of the sliding sheet slides towards a first horizontal sliding element of the cover, and a second horizontal fastening element of the sliding sheet fastens with a first horizontal fastening element of the frame. A horizontal speed of motion of the sliding sheet with respect to cam rotation is proportional to the rotational angle of the handle shaft, so that there are no unequal forces caused by the handle shaft.

4 Claims, 6 Drawing Sheets

LOCKING MECHANISM

BACKGROUND OF THE INVENTION

1. Field of the Invention

The present invention relates to a locking mechanism and, more particularly, to a locking mechanism for electrical appliances, electronic products or an information apparatus. The present invention is especially suitable for a computer server housing.

2. Description of the Related Art

A typical electrical appliance, electronic product or information apparatus usually needs a locking mechanism to lock a door or a cover of the product on a housing or a frame. For example, a computer server housing utilizes screws to lock a cover of the housing onto a frame of the housing.

Besides utilizing screws, there are some other alternative locking methods, such as a link bar locking mechanism. Please refer to FIG. 5. In a prior art link bar locking mechanism, a shaft 91 is rotated, which drives two link bars 92, 93 along two sides of the shaft 91, moving the link bars 92, 93 up and down. Ends of the two link bars 92, 93 are respectively wedged into locking holes 95 of a frame 94 to lock the cover 90. The two link bars 92, 93 move in a simple harmonic motion, but when the shaft 91 is rotated, each angle of rotation may provide a different force, which may cause an unbalanced motion to the two link bars 92, 93 during a locking or a unlocking procedure of the cover 90. Furthermore, this link bar mechanism requires many screws, which leads to a higher number of parts, added assembly times and general inconvenience.

SUMMARY OF THE INVENTION

A main objective of the present invention is to provide a locking mechanism with a simplified structural design to reduce the overall number of parts number, and to provide a more convenient and balanced locking mechanism.

To achieve these objectives, the locking mechanism of the present invention is mounted on a cover to lock the cover onto a frame, the cover having a circular hole and at least one first horizontal sliding element placed in a protruding manner thereon, the frame having at least one first horizontal fastening element.

The locking mechanism includes a sliding sheet, rotating sheet and a handle shaft. The sliding sheet has at least one second horizontal sliding element, at least one second horizontal fastening element, at least one second cam element and an aperture. The rotating sheet has at least one first cam element, a central hole and at least one engaging section. The handle shaft is inserted through the circular hole, the aperture and the central hole to rotationally mount the rotating sheet on the cover. The handle shaft has at least one engaging portion placed corresponding to the engaging section of the rotating sheet to drive the rotating sheet to rotate around the central hole. The first cam element of the rotating sheet drives the second cam element of the sliding sheet by way of rotation, and so the second horizontal fastening element of the sliding sheet slides towards the first horizontal sliding element of the cover and the second horizontal fastening element of the sliding sheet fastens to the first horizontal fastening element of the frame. For unlocking, if the handle shaft is rotated in the opposite direction, the second fastening element of the sliding sheet will detach from the first fastening element of the frame.

As a consequence, a horizontal speed of motion of the sliding sheet with respect to the cam rotation is proportional to the rotational angle of the handle shaft, and so there is no unbalanced force caused by the handle shaft. Moreover, the locking mechanism has a simple structure, having none of the problems associated with the prior art link bar mechanism, and can simplify the structural design to reduce the number of parts number and improve the convenience and prevent unbalanced motion.

The handle shaft of the present invention further includes at least one hook attached on the rotating sheet to rotationally mount the rotating sheet onto the cover. Other fastening methods may also be used.

The first horizontal sliding element of the cover may be a guide block and the second horizontal sliding element of the sliding sheet a horizontal slot, or vice versa. The second cam element of the sliding sheet may be a guiding pin and the first cam element of the rotating sheet an arc-shaped cam slot, or vice versa. To provide for a more smooth rotation of the rotating sheet, a plurality of protrusions may be disposed against the sliding sheet to reduce friction between the rotating sheet and the sliding sheet. The protrusions may also be disposed on the sliding sheet.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
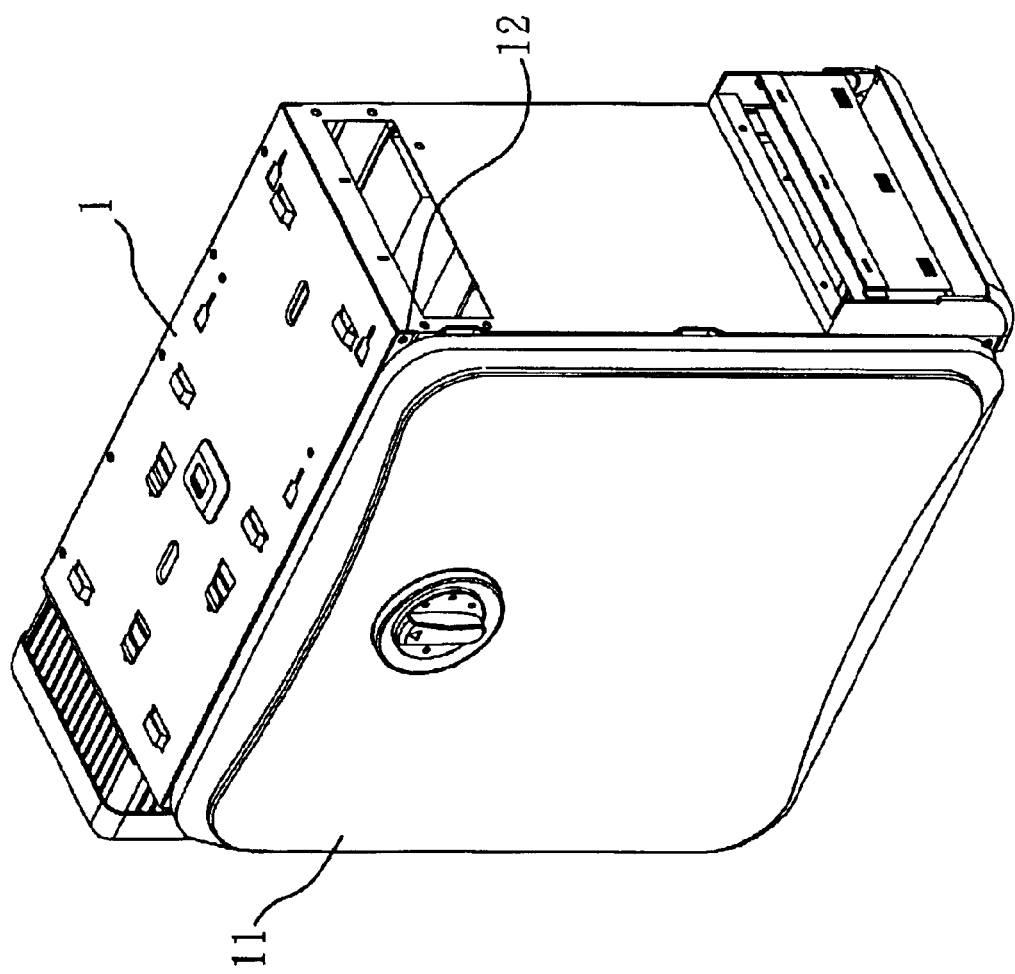
FIG. 1 is a perspective view of a computer server housing with a locking mechanism according to the present invention.
Figure 2:
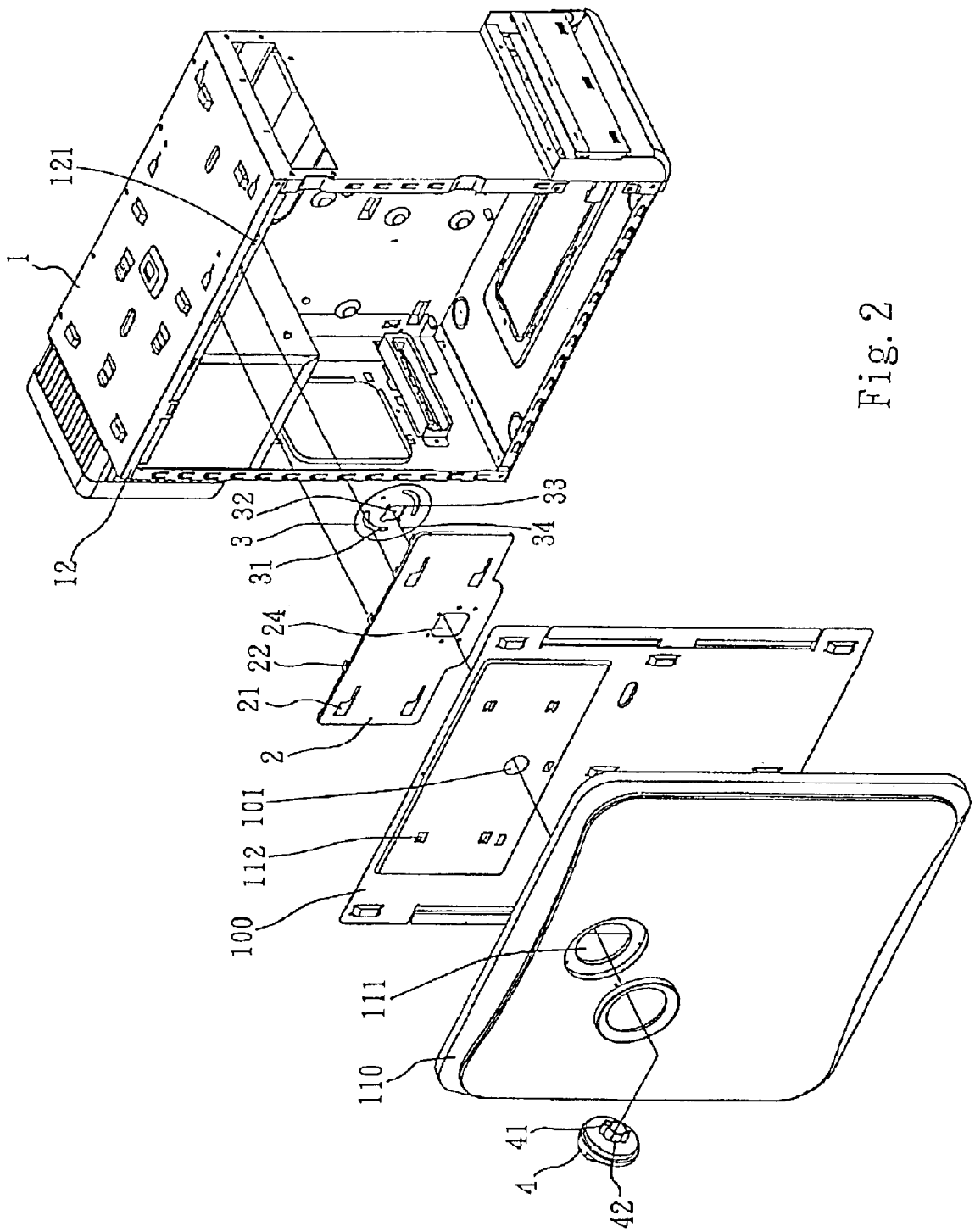
FIG. 2 is an exploded view of the present invention.
Figure 3:
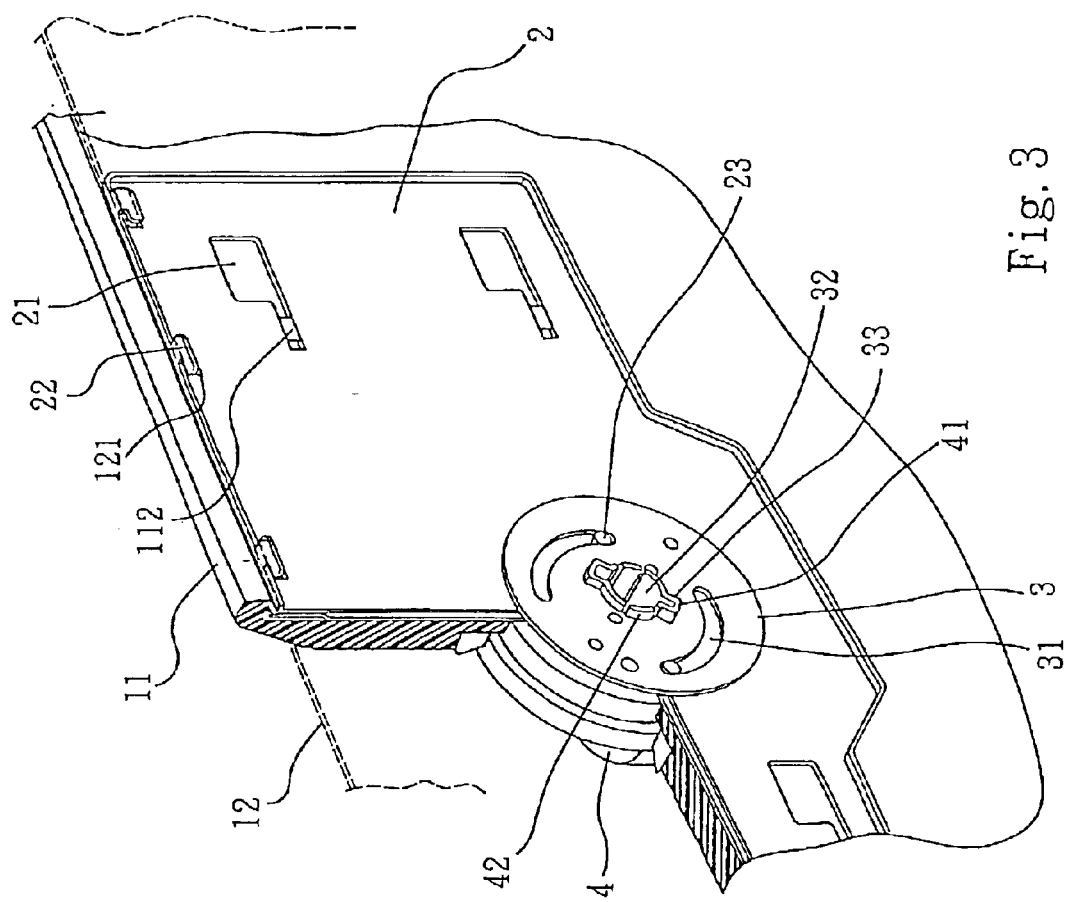
FIG. 3 is a cross-sectional drawing of the present invention.

Please refer to FIG. 1. FIG. 1 is a perspective view of a computer server housing with a locking mechanism according to the present invention. A door or cover locking mechanism of the present invention is mounted on a cover 11 of a housing 1 of a computer server to lock the cover 11 onto an associated cover frame 12 of the housing 1. Please refer to FIG. 2 and FIG. 3. FIG. 2 is an exploded view of the present invention. FIG. 3 is a cross-sectional drawing of the present invention. In this embodiment, the cover 11 is composed of a steel body 100 and a plastic body 110, but it should be clear that the cover 11 could also be made from a single sheet of material. Two circular holes 101, 111 are respectively formed on the steel body 100 and the plastic body 110; four first horizontal sliding elements 112 are placed on the steel body 100 in a protruding manner. The frame 12 has four first horizontal fastening elements 121. In this embodiment, the first horizontal sliding elements 112 are guide blocks, and the first horizontal fastening elements 121 are holes.

A sliding sheet 2 shown in the drawings has four second horizontal sliding elements 21, four second horizontal fastening elements 22, two second cam elements 23 and an aperture 24. In this embodiment, the second horizontal sliding element 21 is a horizontal slot, the second horizontal fastening element 22 is a hook, and the second cam element 23 is a guiding pin. A rotating sheet 3 shown in the drawings comprises two first cam elements 31, a central hole 32 and two engaging sections 33. In this embodiment, the first cam element 31 is an arc-shaped cam slot. A handle shaft 4 is inserted through the circular holes 101, 111 of the cover 11, the aperture 24 of the sliding sheet 2 and the central hole 32 of the rotating sheet 3 to rotationally mount the rotating sheet 3 on the cover 11. The handle shaft 4 further has two engaging portions 41 placed respectively corresponding to the engaging section 33 of the rotating sheet 3. In this embodiment, the handle shaft 4 further comprises two hooks 42 attached on the rotating sheet 3 to rotationally mount the rotating sheet 3 on the cover 11 in a self-locking manner. The fastening mechanism employed by the hooks 42 can be replaced by other fastening methods, such as screws, glue, embedding, etc.

Figure 4A:
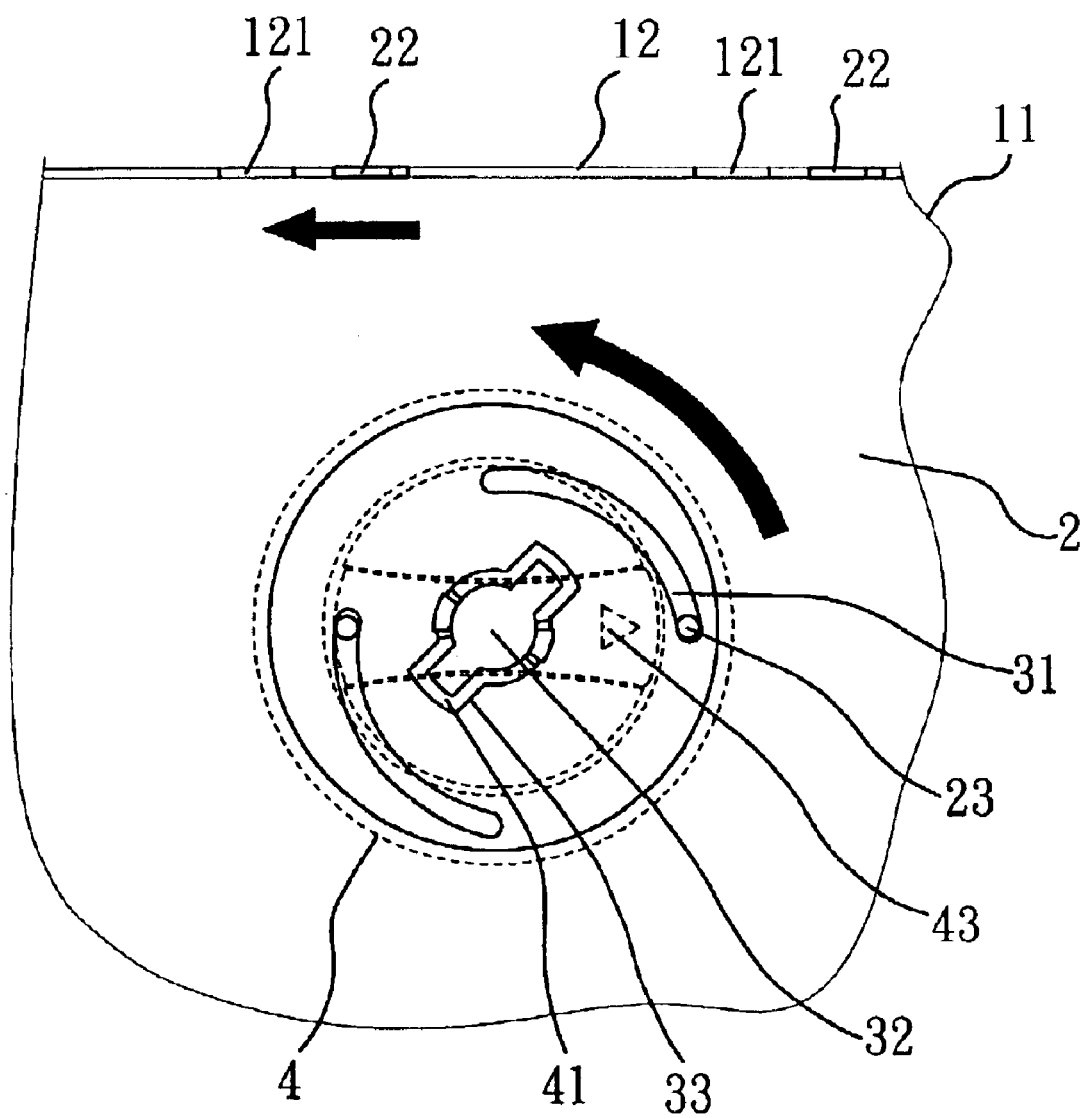
FIG. 4A is a schematic drawing of unlocking according to the present invention.
Figure 4B:
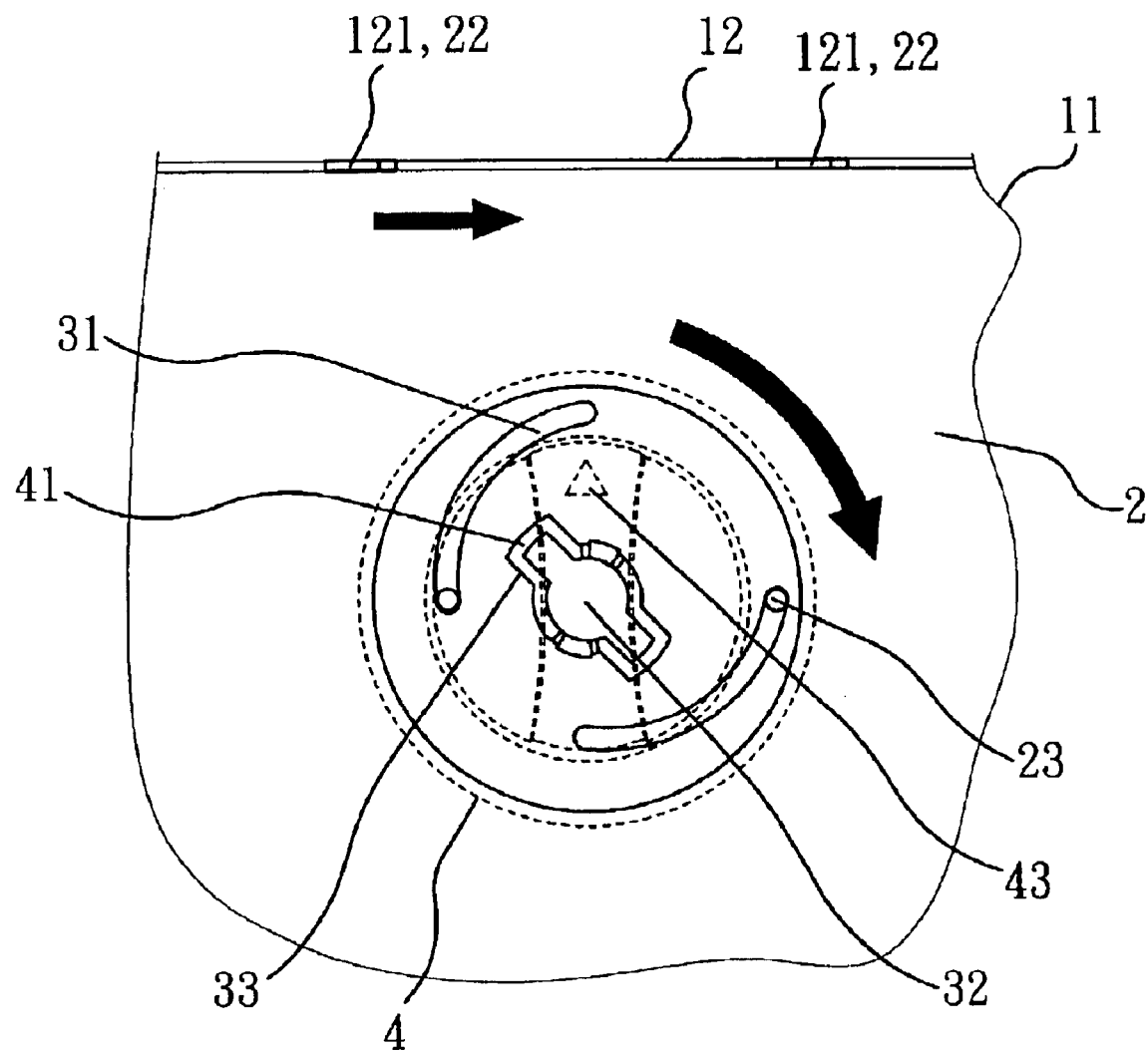
FIG. 4B is a schematic drawing of locking according to the present invention.
Figure 5:
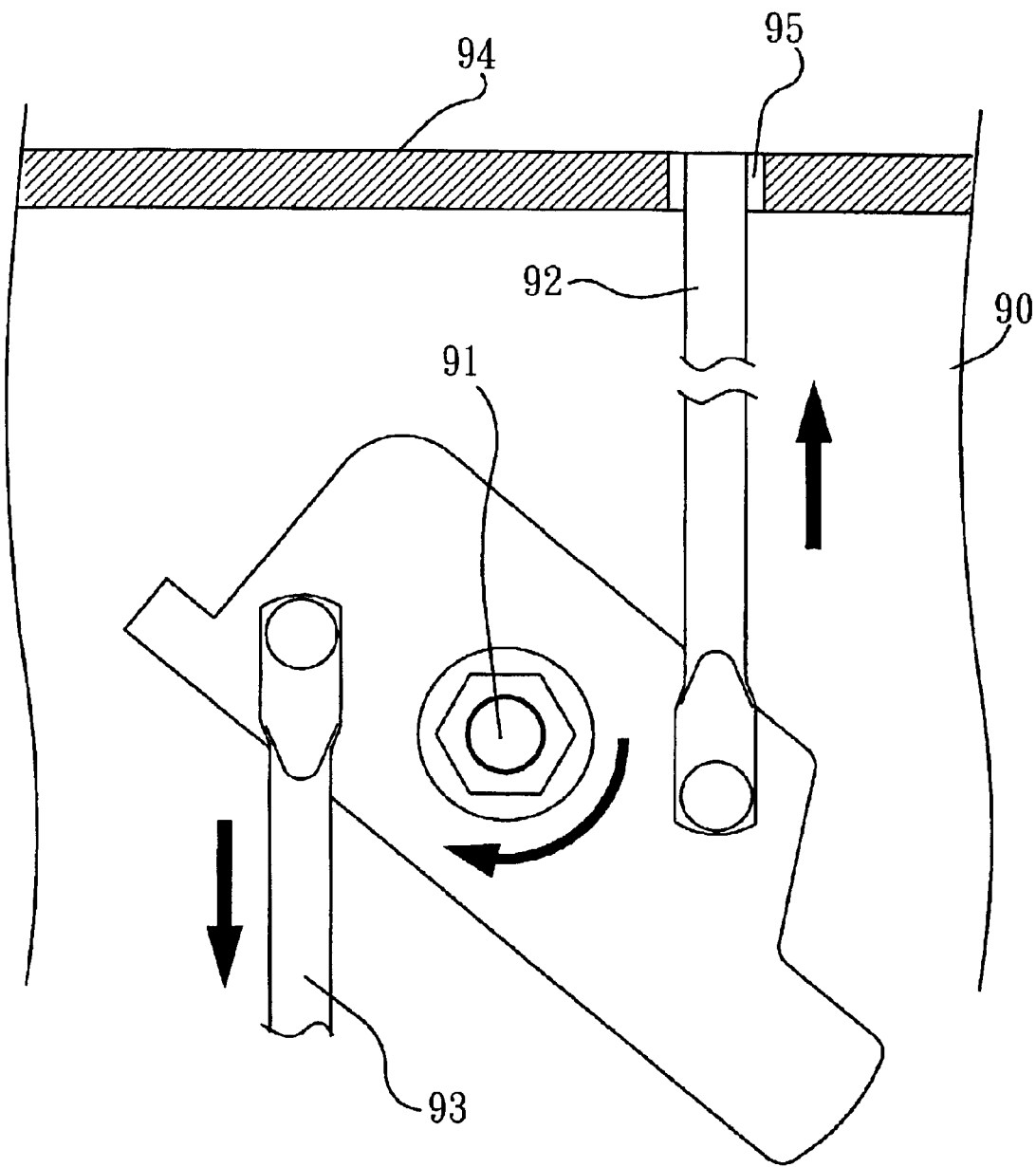
FIG. 5 is a schematic drawing of a prior art link bar locking device.

Please refer to FIG. 3, FIG. 4A and FIG. 4B. FIG. 3 is a cross-sectional drawing of the present invention. FIG. 4A is a schematic drawing of unlocking according to the present invention. FIG. 4B is a schematic drawing of a locking according to the present invention. In order to go from an unlocked position to a locked position, the handle shaft 4 is rotated so the engaging portions 41 of the handle shaft 4 apply a force to the engaging sections 33 of the rotating sheet 3 to drive the rotating sheet 3 to rotate around the central hole 32. The first cam element 31 (the arc-shaped cam slot) of the rotating sheet 3 drives the second cam element 23 (the guiding pin) of the sliding sheet 2 by way of rotation, and the first horizontal sliding element 112 (the guiding block) of the cover 11 slides on the second horizontal sliding element 21 (the horizontal slot) so that the second horizontal fastening elements 22 (the hooks) of the sliding sheet 2 fasten on the first horizontal fastening elements 121 (holes) of the frame 12. On the other hand, in order to go from the locked position to the unlocked position, the handle shaft 4 is simply rotated in the opposite direction. To indicate the appropriate rotational directions of the handle shaft 4 for locking and unlocking, respective arrows can be placed on the handle shaft 4.

The horizontal speed of motion of the sliding sheet 2 according to a cam rotation is proportional to the rotational angle of the handle shaft 4, and so there are no unbalanced or unequal forces caused by the handle shaft 4. Moreover, the locking mechanism has a simple structure and has none of the problems associated with the prior art link bar mechanism, and can thus simplify overall structural designs to reduce the number of parts and improve the convenience and the balanced motion.

The first horizontal sliding elements 112 of the cover 11 are a guide blocks, and the second horizontal sliding elements 21 of the sliding sheet 2 are horizontal slots, but the reverse arrangement is also possible. In the same vein, the second cam element 23 of the sliding sheet 2 is a guiding pin and the first cam element 31 of the rotating sheet 3 is an arc-shaped cam slot, but these characteristics may also be swapped. Also, the first horizontal fastening element 121 and the second horizontal fastening element 22 may be swapped.

Please refer again to FIG. 2. To provide for a smooth rotation of the rotating sheet 3, a plurality of protrusions 34 are disposed on the rotating sheet 3 to reduced friction between the rotating sheet 3 and the sliding sheet 2. The protrusions 34 may also be disposed on the sliding sheet 2.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A locking mechanism mounted on a cover to lock said cover onto a frame, said cover having a circular hole and at least one first horizontal sliding element placed in a protruding manner thereon, said frame having at least one first horizontal fastening element, said locking mechanism comprising:

a sliding sheet having at least one second horizontal sliding element, at least one second horizontal fastening element, at least one second cam element, and an aperture;

a rotating sheet having at least one first cam element, a central hole and at least one engaging section;

a handle shaft inserted through said circular hole, said aperture and said central hole to rotationally mount said rotating sheet on said cover, said handle shaft having at least one engaging portion placed respectively corresponding to said at least one engaging section of said rotating sheet to drive said rotating sheet to rotate around said central hole, the first cam element of said rotating sheet driving the second cam element of said sliding sheet due to rotation of said rotating sheet so that the second horizontal fastening element of said sliding sheet slides to the first horizontal sliding element of said cover and the second horizontal fastening element of said sliding sheet fastens with the first horizontal fastening element of said frame; and the second cam element of said sliding sheet is a guiding pin, and the first cam element of said rotating sheet is an arc-shaped cam slot.

2. The locking mechanism as claimed in claim 1 wherein said handle shaft further comprises at least one hook attached on said rotating sheet to rotationally mount said rotating sheet on said cover.

3. The locking mechanism as claimed in claim 1 wherein the first horizontal sliding element of said cover is a guide block, and the second horizontal sliding element of said sliding sheet is a horizontal slot.

4. The locking mechanism as claimed in claim 1 wherein said rotating sheet further comprises a plurality of protrusions disposed against said sliding sheet.

* * * * *